United States Patent
Kitamura et al.

(10) Patent No.: US 6,188,871 B1
(45) Date of Patent: Feb. 13, 2001

(54) REGIONAL COMMON-USE BLOCK OF CATV SYSTEM AND CATV SYSTEM USING THE REGIONAL COMMON-USE BLOCKS

(75) Inventors: Hideo Kitamura, Chiba; Katsuyuki Ishiyama, Ichihara; Kuniyuki Kanai, Funabashi; Shinpei Yamaguchi, Chiba, all of (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 08/768,796

(22) Filed: Dec. 18, 1996

(30) Foreign Application Priority Data

Dec. 18, 1995 (JP) .................................................. 7-328867
Sep. 17, 1996 (JP) .................................................. 8-245207

(51) Int. Cl.$^7$ .................................................... H04N 7/10
(52) U.S. Cl. .............................. 455/6.1; 455/6.2; 348/12
(58) Field of Search ................... 348/6, 7, 8, 10, 348/12, 13; 455/3.1, 4.1, 4.2, 5.1, 6.1, 6.2

(56) References Cited

U.S. PATENT DOCUMENTS

| | | | | |
|---|---|---|---|---|
| 4,135,157 | * | 1/1979 | Den Toonder | 455/6.2 |
| 5,027,426 | * | 6/1991 | Chiocca, Jr. | 455/5 |
| 5,136,411 | * | 8/1992 | Paik et al. | 359/125 |
| 5,387,927 | * | 2/1995 | Look et al. | 348/6 |
| 5,412,416 | * | 5/1995 | Nemirofsky | 348/10 |
| 5,512,935 | * | 4/1996 | Majeti et al. | 348/9 |
| 5,619,251 | * | 4/1997 | Kuroiwa et al. | 348/12 |
| 5,724,646 | * | 3/1998 | Ganek et al. | 455/4.2 |
| 5,768,375 | * | 6/1998 | Yamauchi et al. | 380/10 |
| 5,828,403 | * | 10/1998 | DeRodeff et al. | 348/7 |

FOREIGN PATENT DOCUMENTS 759072    3/1995   (JP) .

* cited by examiner

Primary Examiner—Victor R. Kostak

(57) ABSTRACT

A regional common-use block for a CATV system, which can be flexibly managed with increased convenience according to regional requirements, and which does not require a large-scale installation at each subscriber location, thereby lowering cost to each subscriber. Additionally, a CATV system using a plurality of the regional common-use blocks wherein a regional common-use block is interposed between a CATV center and each subscriber instrument and includes a set-top-converter (STC) which is commonly held by a specified unit number of subscribers in a local area, and wherein switching control is conducted to transmit an output of a STC to a plurality of subscribers. The common-use block separates multiplexed signals from the CATV center, converts the separated signals by each STC, controls circuit switching means, modulates the signals by RF modulating means and subsequently transmits the requested programs to subscribers.

28 Claims, 18 Drawing Sheets

FIG.6

| SUBSCRIBER ID | WORKING CONVERTER ID | ID OF PROGRAM BEING VIEWED | ID OF PERMITTED PROGRAM |
|---|---|---|---|
| 1 | 2 | 10 | 1~30 |
| 2 | 1 | 6 | 5~20 |
| 3 | NIL | NIL | 1~25,8 |
| 4 | 2 | 8 | 2,4,10 |
| ---- | ---- | 10 | ---- |
| M | N | 20 | 10~30 |

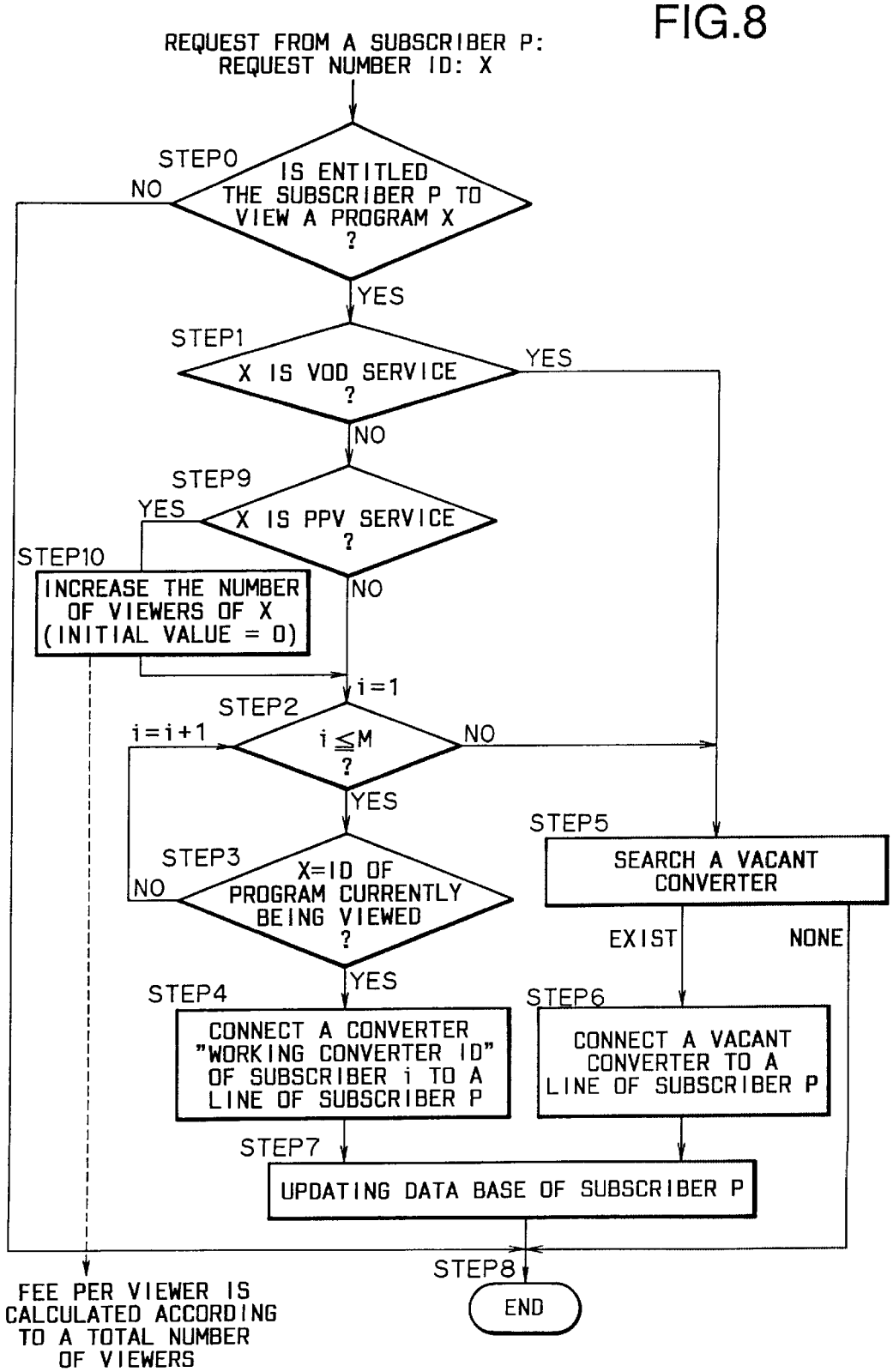

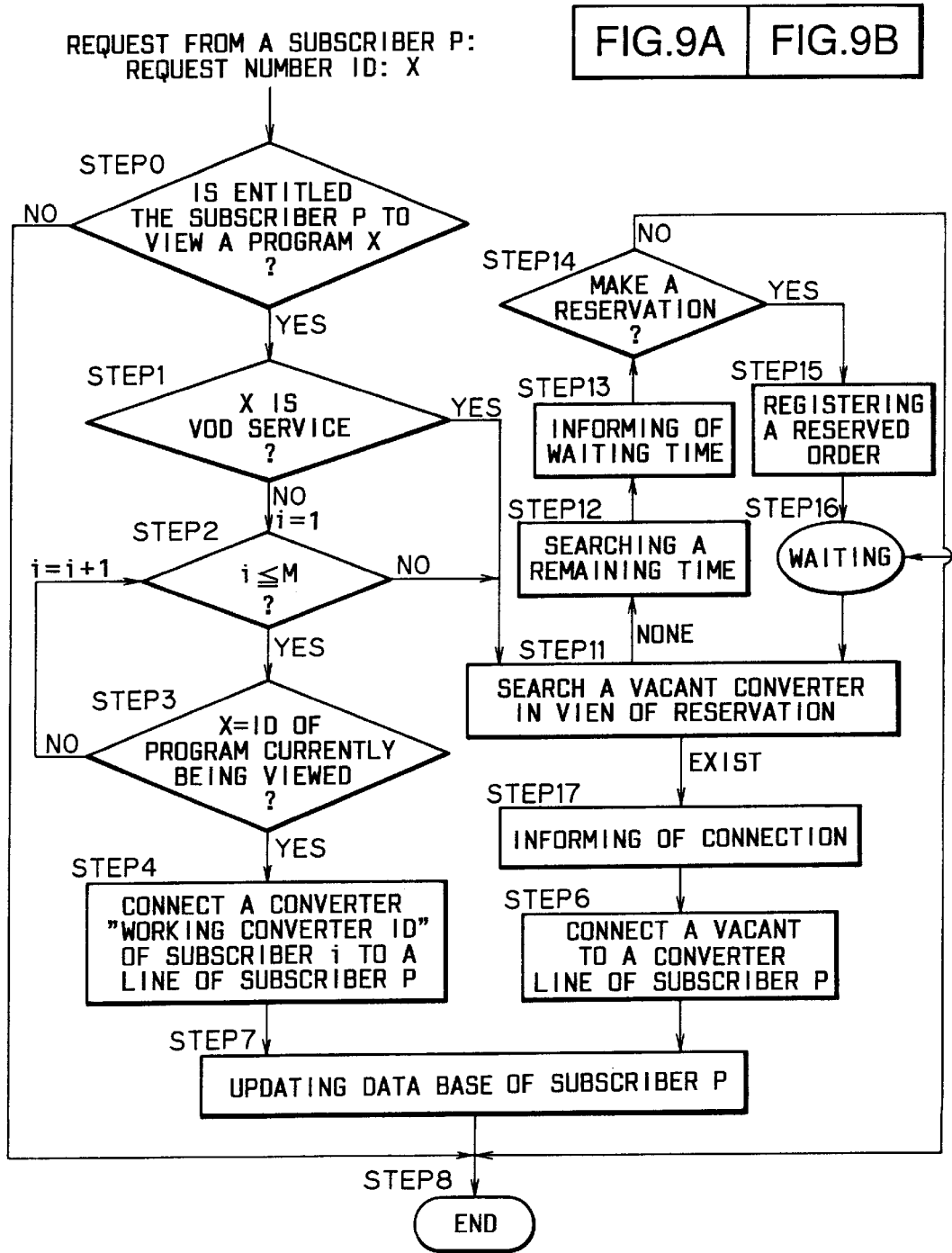

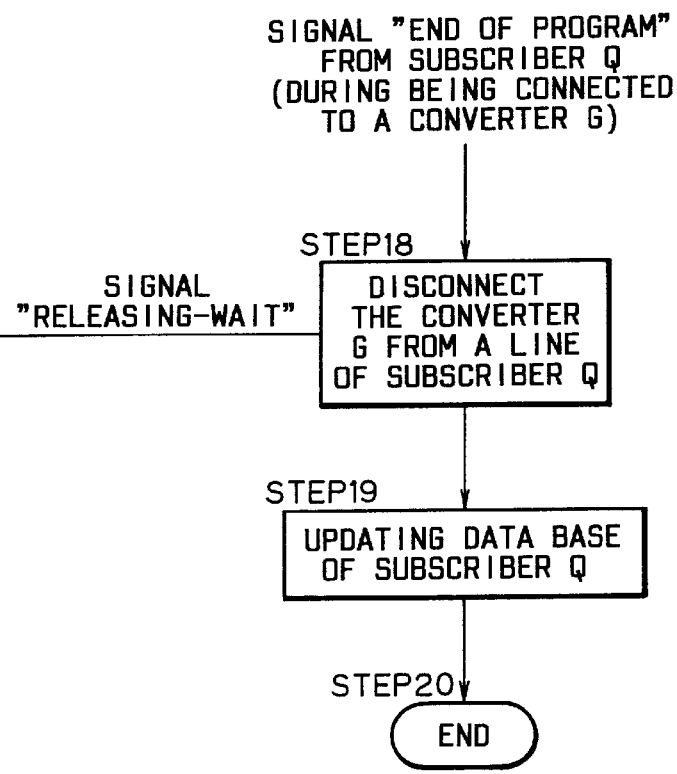

| FIG.14A |
| FIG.14B |

REGIONAL COMMON-USE BLOCK OF CATV SYSTEM AND CATV SYSTEM USING THE REGIONAL COMMON-USE BLOCKS

BACKGROUND OF THE INVENTION

Multi-channel television services via fiber optics and coaxial cables using digital compressing technique such as MPEG and digital modulation techniques such as QAM (Quadrature Amplitude Modulation) and QPSK (Quadrature Phase Shift Keying) have nowadays been developing. However, to receive signals emitted from a CATV center and to view a CATV program, it is normally necessary to use a set-top-converter (STC) composed of a MPEG decoder and a QAM demodulator.

A conventional CATV system provides subscribers with multi-channel services by the above-mentioned method. Therefore, when a subscriber wants to view CATV programs on a plurality of TV sets, he or she must provide the TV sets with separate STCs respectively. The considerable expense falls on the subscriber. Japanese Laid-open Patent Publication No. 7-59072 discloses such a unit that is attached to one CATV terminal, allowing a plurality of TV sets to receive the CATV programs. This attempt may be an improvement but still requires a large-scale CATV terminal.

As described above, any conventional CATV system requires each subscriber to provide each TV set with a CATV terminal unit or a large-scale CATV terminal to enjoy a plurality of CATV programs on a plurality of TV sets. This increases the subscriber's charge. A CATV center to which all functions of the system are concentrated may not be so flexible to manage each of areas to be covered.

SUMMARY OF THE INVENTION

The present invention relates to a bi-directional CATV system capable of providing a plurality of services and, more particularly, to regional common-use blocks composing a system capable of separating multiplexed signals transmitted from a CATV center and reorganizing signals to provide individual subscribers with different services and a CATV system that uses the regional common-use blocks. The present invention is therefore intended to provide a regional common-use block composing a system that can effectively manage by regional groups of subscriber terminals and reduce charges of subscribers by eliminating the necessity of using a large-scale terminal unit and to provide a CATV system using the regional common-use blocks.

The system according to the present invention is to bring out functional blocks corresponding to STCs installed in subscribers' houses in the conventional system and to commonly use the STCs by a unit regional group of subscribers and control them by switching so that an output of each STC can be transmitted to a plurality of subscribers, thus minimizing the number of STCs used in a regional common-use block as compared with the conventional system.

A subscriber who desires to view CATV programs on a plurality of TV sets in his or her home may seldom enjoy CATV at a time on two TV sets installed in different places, e.g., in a living room and a dining room. Therefore, the system according to the present invention makes it possible to effectively use vacant STCs in common and reduce the number of necessary STCs, as compared with the conventional system.

According to the present invention, video-audio signals and data requested by each subscriber can be transmitted as mixed or combined signal data in a vacant channel of TV signals. This enables each subscriber to receive a desired CATV program on each TV set through a simple receiver attached thereto, bearing a cost of a receiver plus a part of expenses for a STC used in common. Consequently, total expenses charged on a subscriber who receives CATV services with a plurality of TV sets are lower in comparison with the conventional case.

The above-mentioned features of the system according to the present invention may promote use of CATV services. Each provider of CATV services can also expect an increase in audience fee by increasing the number of subscribers. Furthermore, the use of regional common-use blocks enables the provider to provide the suitable services to respective areas and to easily maintain the system, since all essential parts are contained in a CATV center and regional common-use blocks.

Thus, the present invention is intended to reduce costs of a CATV installation and subscriber terminals, to provide a CATV rich in content of services, and to improve maintainability, extendability and safety of the system.

(1) Accordingly, an object of the present invention is to provide a regional common-use block which comprises: separating means for separating video, audio and data in a multiplexed signal transmitted from a CATV center; a plurality of converting means consisting of elementary means (e.g., an analog demodulator, a digital demodulator or digital demodulator and compressed digital demodulator) for taking-out video, audio and data by converting signals separated by the separating means; an upward signal decoding portion; switching means for switching connections between the converters and subscribers' lines according to the successive subscriber's requests received from the upward signal decoding portion and RF-modultors for modulating TV signals to be transmitted to subscribers lines switched and connected by the switching means with a predetermined frequency of one of plural vacant channels; and which is characterized in that the converting means digitally demodulates signals (e.g., QPSK modulated signals, QAM modulated signals) contained in signals from the CATV center, decode the compressed digital signal and take out original video and audio signals and, then, the switching means converts the taken-out video and audio signals with RF (radio-frequency) of a predetermined vacant channel, makes connection to lines of the requesting subscribers and transmits the modulated video and audio signals to the subscribers.

(2) Another object of the present invention is to provide a regional common-use block of a CATV system, which is mentioned in item (1) and characterized in that a telephone interface (I/F) portion is further provided as an additional element for dealing with a telephone signal in such a manner that a signal from the telephone I/F portion is mixed with a TV signal modulated by the RF modulator and then transmitted together via a cable to a subscriber, thus enabling each subscriber to exchange necessary information by using a simple receiver (e.g., TV set, telephone set) without recognizing a network.

(3) Another object of the present invention is to provide a regional common-use block of a CATV system, which is mentioned in item (1) or (2) and characterized in that, in case when a broadcast program requested by a subscriber has been already converted by the converting means and connected to another subscriber, the switching means can connect the output of the same converting means to the requesting subscriber, thus increasing the working efficiency of the converting means.

(4) Another object of the present invention is to provide a regional common-use block of a CATV system, which is mentioned in any one of items (1) to (3) and characterized in that a data base relating to subscribers is further provided as an additional element and the switching means are controlled according to a connecting method determined with reference to the data base.

(5) Another object of the present invention is to provide a regional common-use block of a CATV system, which is mentioned in item (4) and characterized in that the data base relating to subscribers contains information on what program each subscriber is entitled to view and a requested program is supplied to a line of a requesting subscriber who is found entitled according to the information stored in the data base but the program will not supplied to the subscriber who is not entitled.

(6) Another object of the present invention is to provide a regional common-use block of a CATV system, which is mentioned in any one of items (1) to (5) and characterized in that a TV signal and/or a telephone signal taken-out by the converting means and modulated by the RF modulator according to the subscriber's request is mixed in free-charge broadcast analog and digital signals separated by the separating means from signals transmitted from the CATV center and then transmitted to a line of the subscriber.

(7) Another object of the present invention is to provide a regional common-use block of a CATV system, which is mentioned in item (6) and characterized in that a TV signal taken-out by the converting means is mixed in a specified channel band of the analog free-charge broadcast signal.

(8) Another object of the present invention is to provide a regional common-use block of a CATV system, which is mentioned in any one of items (1) to (7) and characterized in that a plurality of the converting means is a combination of converters specially used, respectively, for digital satellite broadcasting, digital CATV, analog CATV, cable modem and ISDN to improve economical efficiency and flexibility of the system.

(9) Another object of the present invention is to provide a regional common-use block of a CATV system, which is mentioned in any one of items (1) to (8) and characterized in that the converting means are card type or box plug-in-type, thus making it easier to change the number and kinds of the converters.

(10) Another object of the present invention is to provide a regional common-use block of a CATV system, which is defined in any one of items (1) to (9) and characterized in that storing means are provided as an additional element of performing a local VOD service by supplying video signals therefrom to a subscriber.

(11) Another object of the present invention is to provide a regional common-use block of a CATV system, which is mentioned in item (10) and characterized in that a bit stream from TV signals taken-out by the converting means is stored in the storing means to absorb time lags between the subscribers' requests for the same service.

(12) Another object of the present invention is to provide a regional common-use block of a CATV system, which is mentioned in item (10) or (11) and characterized in that a viewing time-saving function by using a rapid-feed is provided.

(13) Another object of the present invention is to provide a regional common-use block of a CATV system, which is mentioned in item (12) and characterized in that an audio signal recognizing function is provided to make it possible for a subscriber to recognize audio signals even while the rapid feed is executed.

(14) Another object of the present invention is to provide a regional common-use block of a CATV system, which is mentioned in any one of items (10) to (13) and characterized in that a bit stream from the same TV signal is stored in a plurality of places in the storing means to satisfy the requests of a plurality of subscribers.

(15) Another object of the present invention is to provide a regional common-use block of a CATV system, which is mentioned in any one of items (10) to (14) and characterized in that TV signals of programs having high audience rates in a specified period are stored in the order of priority in the storing means, thus realizing saving in capacity of the storing means and, at the same time, satisfying the trend of the subscribers demands.

(16) Another object of the present invention is to provide a regional common-use block of a CATV system, which is mentioned in any one of items (10) to (14) and characterized in that programs can be stored in the storing means according to advanced orders of subscribers.

(17) Another object of the present invention is to provide a regional common-use block of a CATV system, which is mentioned in any one of items (1) to (16) and characterized in that a management function for distributing the converting means to subscribers' lines by using switching means includes an additional function for informing a subscriber of a waiting time until the converting means becomes vacant taking into consideration a residual working time of the converting means besides information on the converting means being busy or vacant.

(18) Another object of the present invention is to provide a regional common-use block of a CATV system, which is mentioned in item (17) and characterized in that such a function is provided that books an advanced order of a subscriber for using the working converting means and will inform the subscriber of the possibility of using the converting means as soon as the converting mean becomes vacant.

(19) Another object of the present invention is to provide a regional common-use block of a CATV system, which is mentioned in any one of items (1) to (18) and characterized in that the management function for distributing the converting means to subscriber lines by using switching means includes an additional function for setting several levels of priority of subscribers to a right of using converting means and manage the distribution of the converting means according to the priority levels.

(20) Another object of the present invention is to provide a regional common-use block of a CATV system, which is mentioned in any one of items (1) to (19) and characterized in that the management function for distributing the converting means to subscriber lines by using switching means includes such an additional function for enabling subscribers to hold in common a "pay per view" right by a plurality of subscribers and therefore receive services at a low charge.

(21) Another object of the present invention is to provide a CATV system characterized in that each subscriber's house is connected in one-to-one star-connection to a regional common-use block, mentioned in any one of items (1) to (20), by using a transmission channel distributed to each subscriber, and a frequency band is used in common to the RF modulators in the regional common-use block and TV signals to be sent to all subscribers are converted to signals of a specified channel band, thus realizing a simplified structure of the system.

(22) Another object of the present invention is to provide a CATV system characterized in that the system has a plurality of regional common-use blocks that are mentioned in any one of items (1) to (20) and connected in parallel to each other to the system in such a way that another regional common-use block can be used when the number of accesses to one regional common-use block exceeds a specified limit value.

(23) Another object of the present invention is to provide a CATV system having a plurality of regional common-use blocks that are mentioned in any one of items (1) to (20) and characterized in that an ID is added to each regional common-use block, thus the delivery of information per each unit block can be easily performed.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 6 shows an example of data to be stored in a data base for subscribers in a regional common-use block according to the present invention.

FIG. 8 is a flow chart showing an example of determining a service fee for common use of PPV in a regional common-use block according to the present invention.

FIGS. 9A and 9B are flow charts showing an example of regional common-use block provided with reservation services function according to the present invention.

DETAILED DESCRIPTION

Prior to explaining preferred embodiments of the present invention, prior art projector devices will be described below as references for the present invention.

Multi-channel television services via fiber optics and coaxial cables using digital compressing technique such as MPEG and digital modulation techniques such as QAM (Quadrature Amplitude Modulation) and QPSK (Quadrature Phase Shift Keying) have nowadays been developing. However, to receive signals emitted from a CATV center and to view a CATV program, it is necessary to use a set-top-converter (STC) composed of a MPEG decoder and a QAM demodulator.

Figure 1:
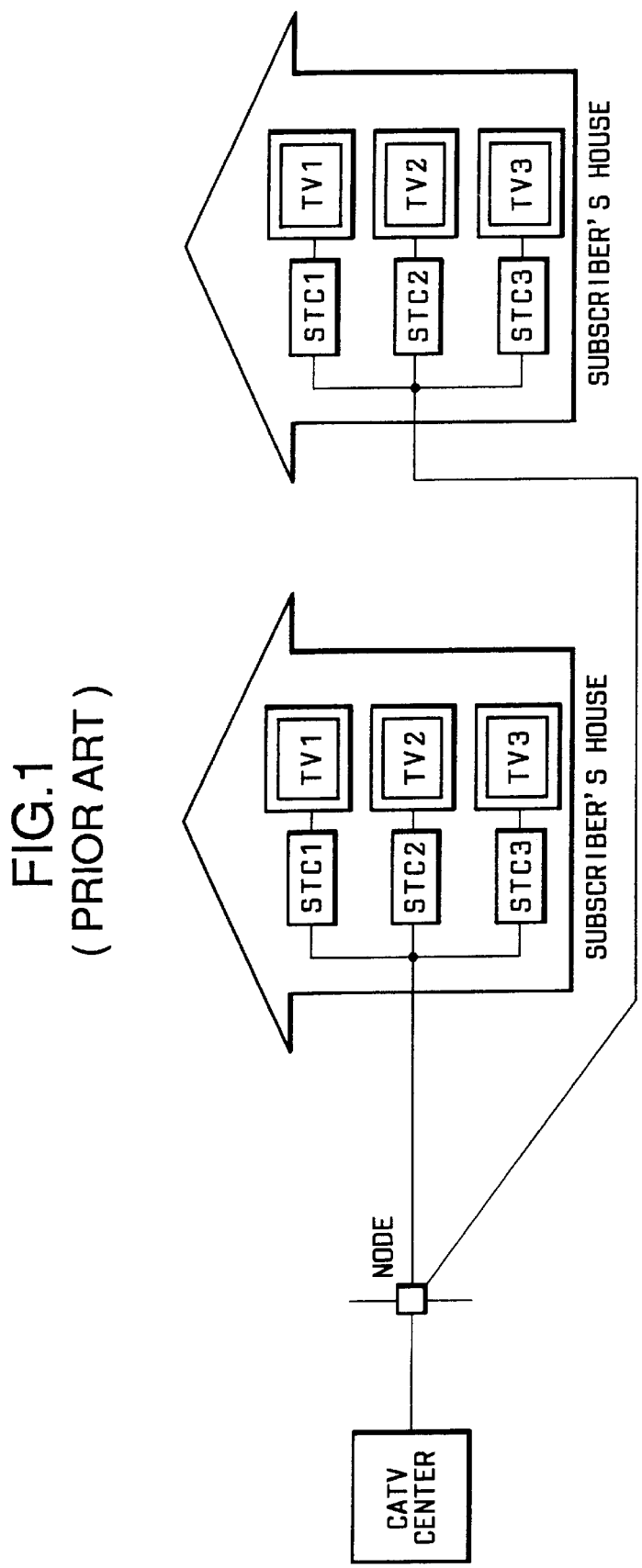
FIG. 1 is a schematic construction view showing a concept of a conventional CATV system.
Figure 2:
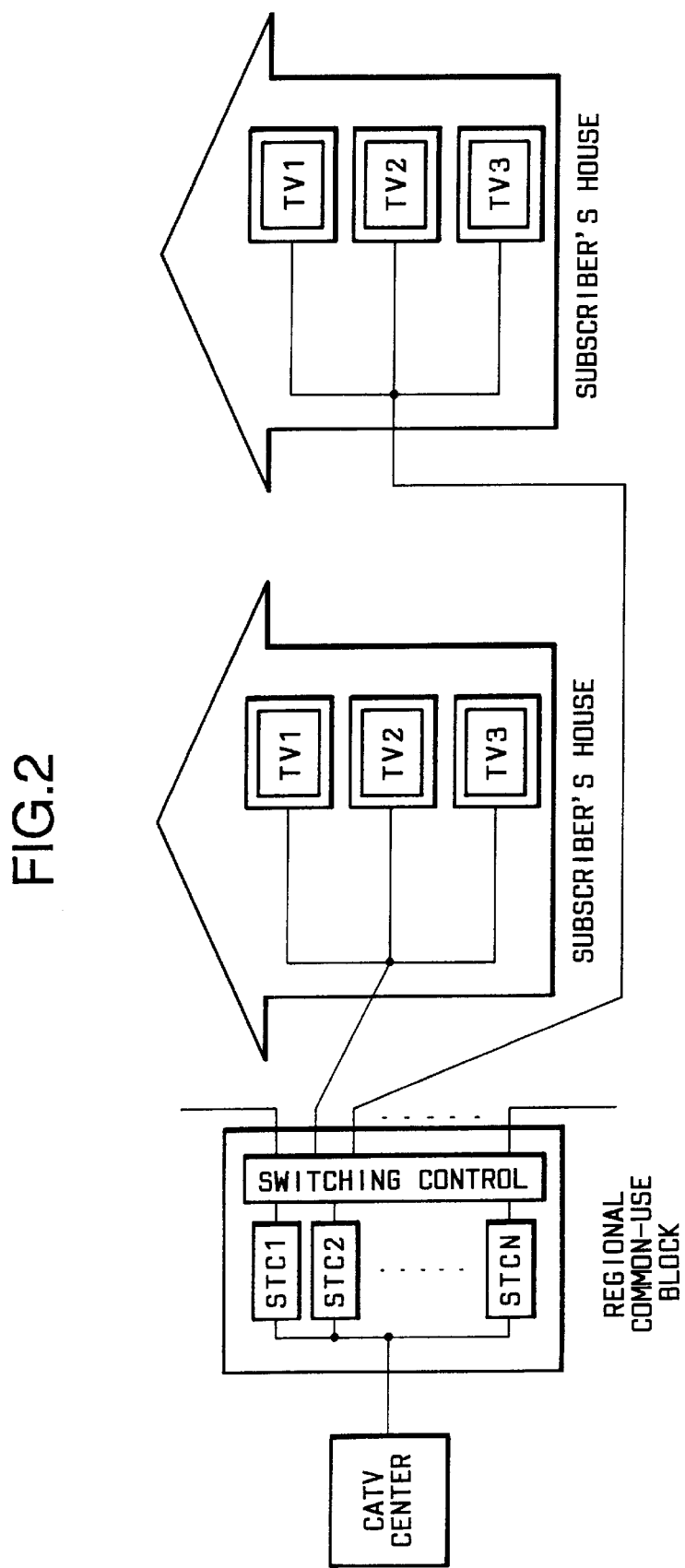
FIG. 2 is a view for explaining a concept of a CATV system according to the present invention.

FIG. 1 illustrates a concept of a conventional CATV system. When a subscriber desires to view the CATV programs on a plurality of TV sets, he or she must provide the TV sets with separate STCs respectively. The considerable expenses fall on the subscriber. Japanese Laid-open Patent Publication No. 7-59072 discloses such a unit that is attached to one CATV terminal, allowing a plurality of TV sets to receive the CATV programs. This attempt may be an improvement but still requires a large-scale CATV terminal.

As described above, any conventional CATV system requires each subscriber to provide each TV set with a CATV terminal unit or a large-scale CATV terminal for enjoying a plurality of CATV programs on a plurality of TV sets in a subscriber's house. This increases the subscriber's charge. A CATV center to which all functions of the system are concentrated may not be so flexible to manage each of local areas to be covered.

The system according to the present invention is to remove functional blocks corresponding to STCs installed in subscribers' houses in the conventional system shown in FIG. 1 and to commonly use the STCs by a unit regional group of subscribers, controlling the unit regional group by switching so that an output of each STC can be transmitted to a plurality of subscribers, thus saving the number of STCs used in a regional common-use block as compared with the conventional system.

Figure 3:
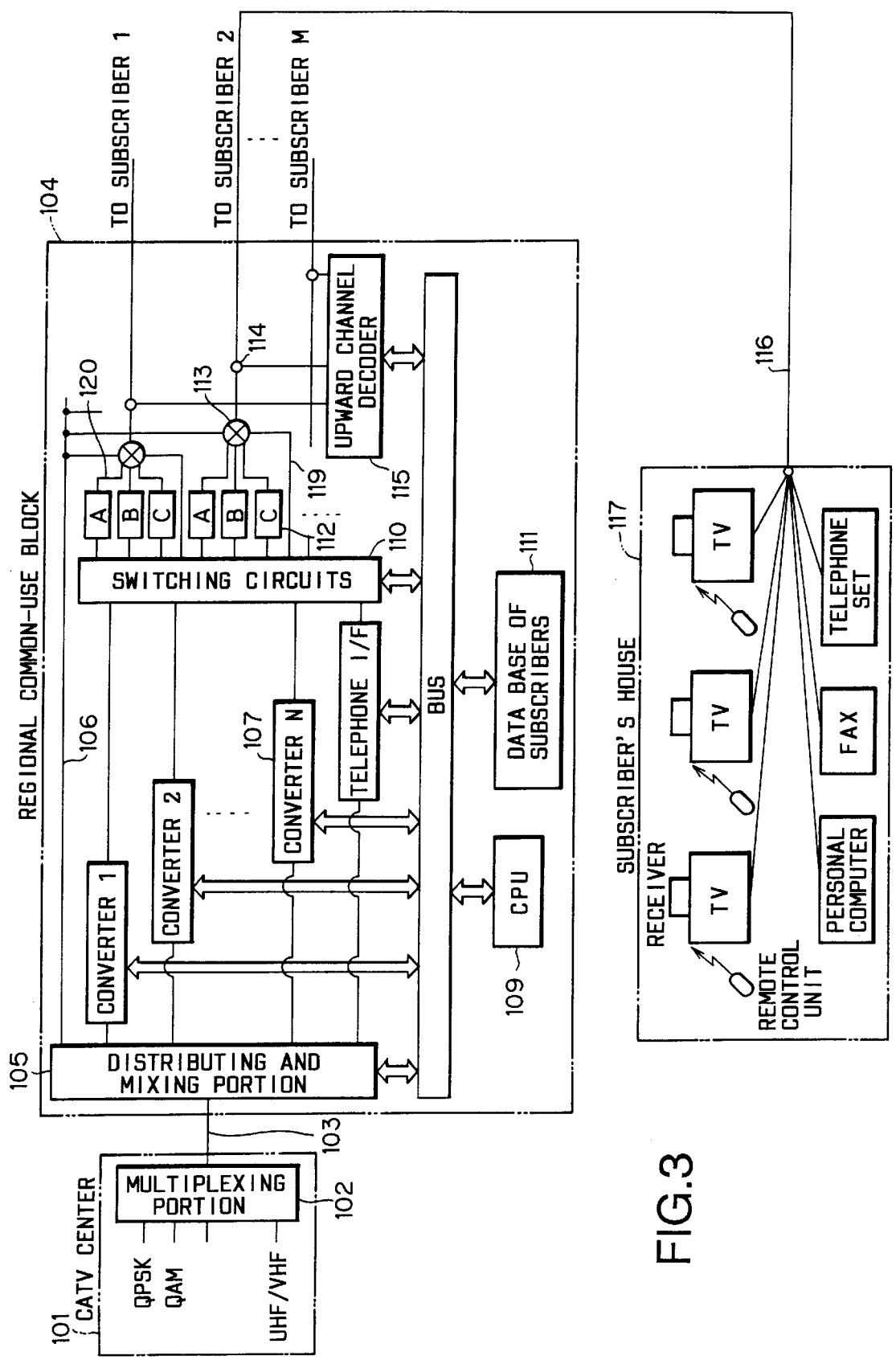
FIG. 3 is a block diagram showing a structure of a whole CATV system embodying the present invention.

Referring now to accompanying drawings, preferred embodiments of the present invention will be described below:

FIG. 3 is a block diagram showing a structure of a whole CATV system embodying the present invention. In FIG. 3, numeral 101 designates a CATV center wherein compressed digital signals stored in a video-server for video-on-demand service (hereinafter abbreviated to VOD which is an embodiment of bi-directional information delivery services to start delivery of a specified program to a specified subscriber from a moment of receiving a specified request from the subscriber) are digital CATV signals modulated by the method of 64QAM (QAM with 64 variations), digital satellite broadcast signals modulated by the method of QPSK, existing UHF/VHF broadcast analog CATV signals, cable modem signals, telephone signals, ISDN signals and so on, which are multiplexed by a multiplexing portion 102 and sent to a transmission line 103 that may be a fiber optics or a coaxial cable.

Numeral 104 designates a regional common-use block placed between the CATV center and subscribers' houses. It may be placed in one of a collective house. In the regional common-use block, a distributing and mixing portion 105 draws-out signals of respective bands for respective converters from the signals transmitted over the transmission line 103 and transfers the drawn-out signals to respective converters 1–N 107 and takes-out a free-charge broadcast 106. The free-charge broadcast 106 is mostly an existing analog broadcast. If the broadcast is digital, it is converted to analog and taken-out.

Figure 4:
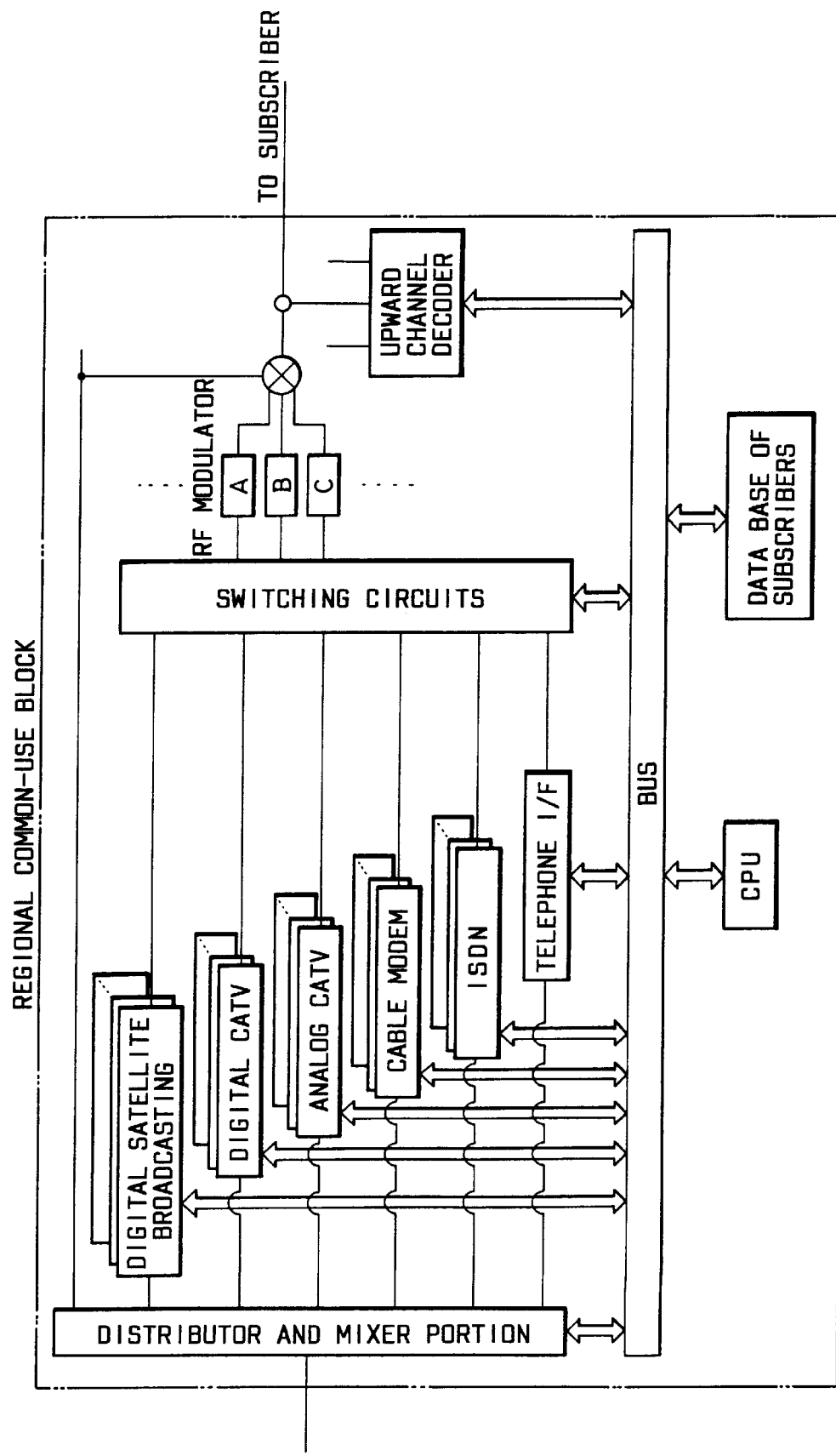
FIG. 4 is illustrative of an embodiment wherein exclusive converters are used in a regional common-use block according to the present invention.

The converters 1–N may be provided each with a function for restoring all kinds of modulated and compressed signals. An example of a regional common-use block shown in FIG. 4, which constitutes a system being in principle similar to that of FIG. 3 but uses a plurality of specially designated converters, e.g., for digital satellite broadcast, digital CATV, analog CATV, cable modem and ISDN respectively. This system can apply more economical (cheaper) converters, adjust the number of converters according to the number of subscribers and the number of requests on each converter. Namely, the system is easy to change and has a high efficiency of use and an excellent flexibility.

Accordingly, the converters of detachable card type or box-plug-in type are used to expand the converter system to usage rates of system components. The system is reliable to work since it may include a number of each kind of converters having the same function that allows accessing another converter if any one of converters is damaged.

Figure 5:
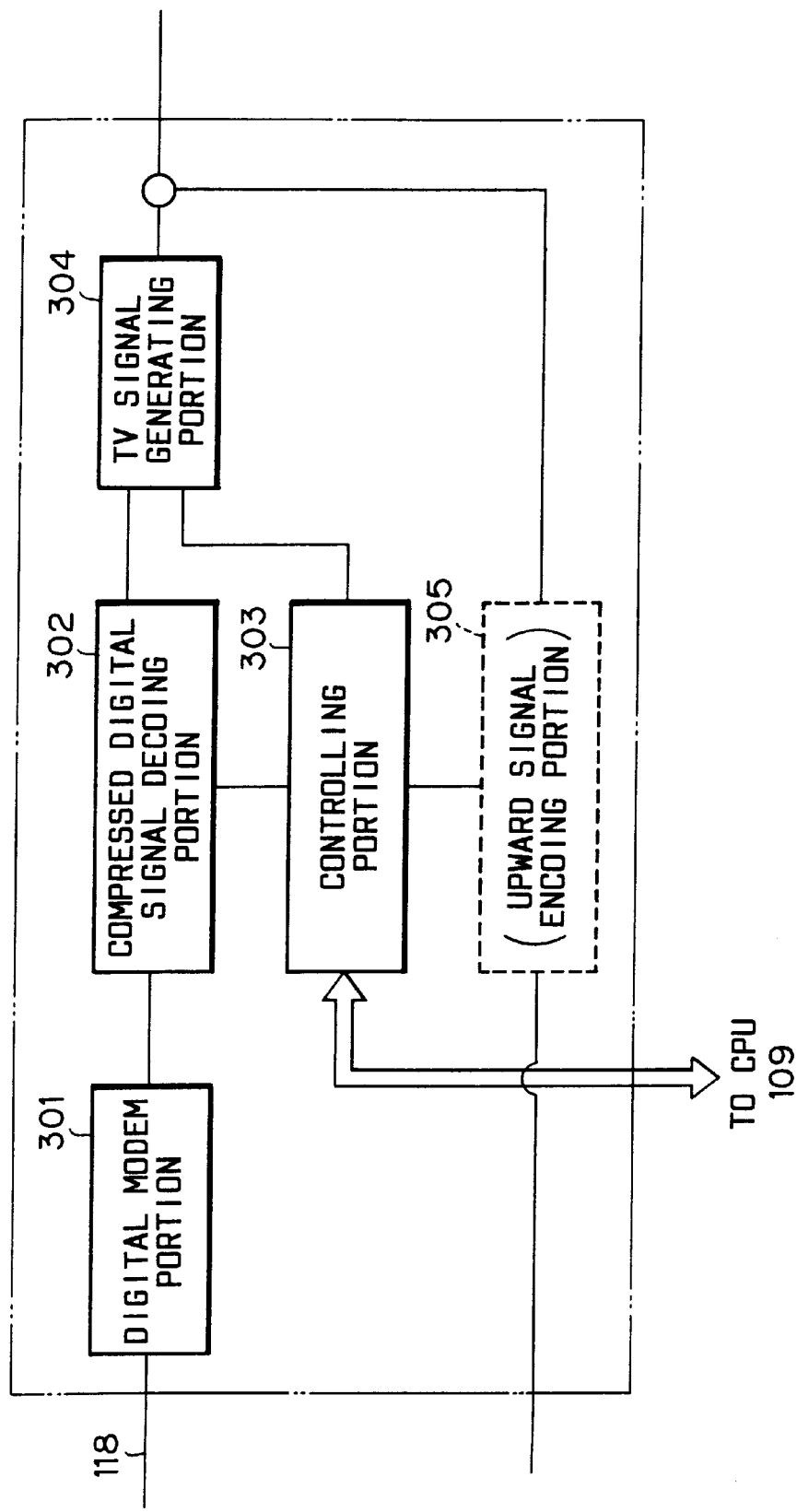
FIG. 5 is a block diagram showing a structure of an embodiment wherein an exclusive converter is used in a regional common-use block according to the present invention.

FIG. 5 is a block diagram showing an example of a converter for, e.g., digital CATV services, which signals are compressed by the method of MPEG, digitally modulated and transmitted. An input signal 118 is decoded by a digital modem portion 301 and restored into video signal and audio signal by a compressed signal decoding portion 302.

The compressed signal decoding portion 302 also draws out application data inserted in the input signal and a control portion 303 generates a graphic image (e.g., a menu) by using the application data and a subscriber's command received from a central processing unit (CPU) 109.

A TV-signal generating portion 304 mixes video and audio signals with a graphic signal, converts them into a signal of NTSC or PAL system and outputs the converted signal.

An upward signal encoding portion 305 receives an upward signal from a subscriber through the CPU 109 and encodes information, e.g., a subscriber's command for VOD service, which is necessary for the CATV center 101 (FIG. 3), into an upward signal to be mixed and transmitted to the CATV center 101 through the distributing and mixing portion 105 (FIG. 3). In the case of returning the upward signal as it is to the CATV center 101, the above-mentioned structure of the converting system, therefore, cannot be limited to that shown in FIG. 5. The converters designated for satellite broadcast, analog CATV, cable modem and ISDN respectively may differ from FIG. 5 depending upon transmission modes and service contents.

In FIG. 3, a telephone signal through the distributing and mixing portion 105 is received by the telephone interface (I/F) 108 and mixed in each subscriber line 116 through a switching circuit 110. A cable 116 of a star network from the regional common-use block extends into each subscriber's house 117. This cable 116 may be fiber optics or a coaxial cable that is preferable from the viewpoint of saving the installation cost.

An upward channel decoder 115 takes out a signal of each subscriber's request from a signal transmitted through a distributor 114. A data base 111 relating to subscribers stores information on each of subscribers. The CPU 109 can switch switching circuits 110 according to a subscriber's request signal and information stored in the data base 111. When a broadcast program requested by a subscriber is already connected through a converter 107 to a transmission line of another subscriber, the CPU 109 controls the switching circuits 110 in such a way that a transmission line of the requesting subscriber is also connected to an output of the same converter. Thus, a program having a high audience rate can be supplied by effectively using converters, leaving converters through which other subscribers can access other programs. Namely, the number of converters needed may be reduced.

FIG. 6 shows an example of information stored in the subscribers data base which content is rewritten every time connections and/or the subscriber's contract is changed. A subscriber ID is an identification number to be given to each subscriber, a working converter ID is an identification number of a converter that is currently connected to a subscriber's house, a current program ID is an identification given to a program that a subscriber is now viewing and an allowable program ID is an identification given to a program that a subscriber is permitted to) see. When a subscriber requests a program other than permitted programs, the switching circuit will not be connected to the subscriber line, thereby eliminating the need for scrambling the broadcast itself and the need for attaching descrambling function to a CATV terminal in the subscriber's house.

Figure 7:
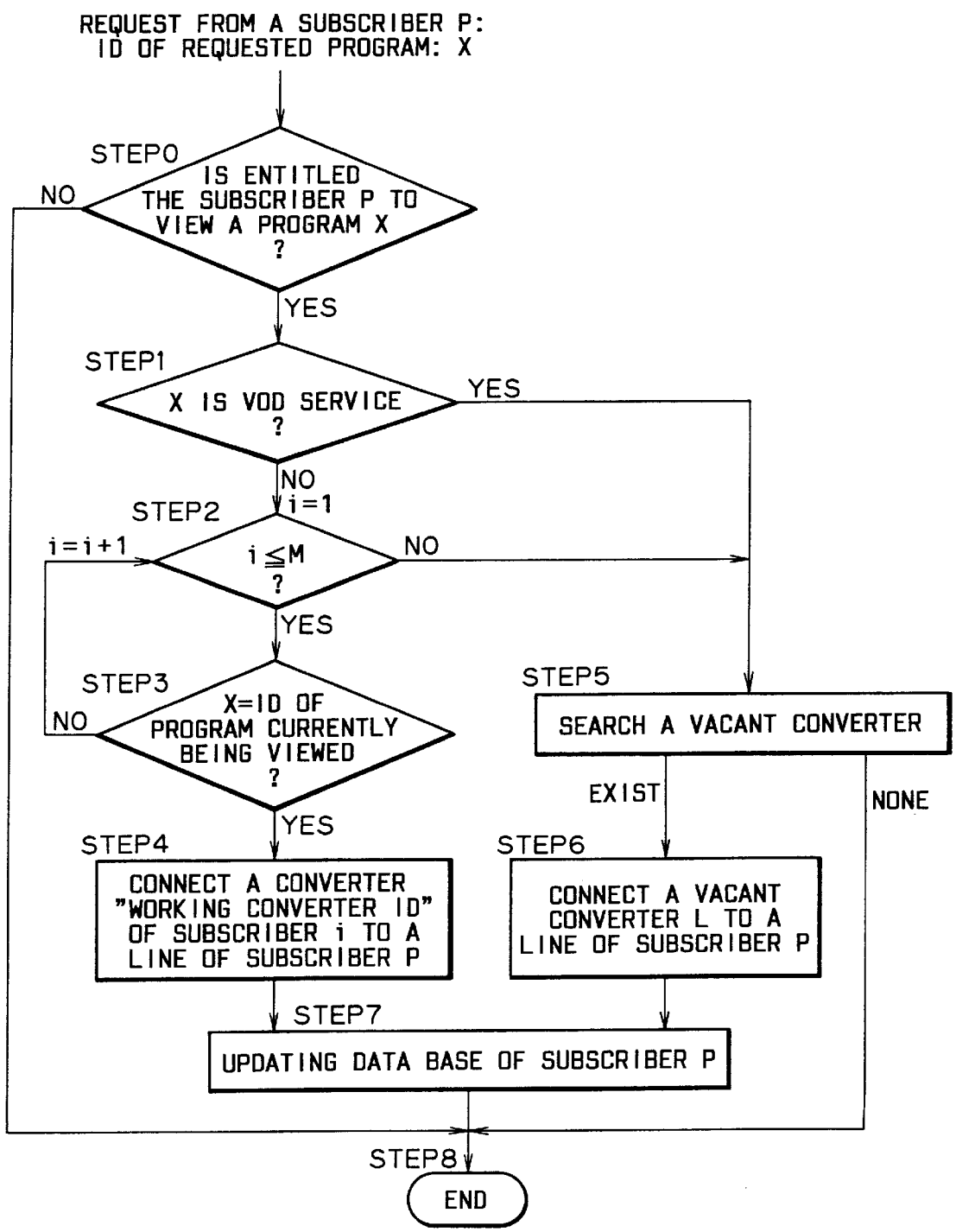
FIG. 7 shows an exemplified flow chart of a switching procedure in a regional common-use block according to the present invention.

FIG. 7 is a flow chart showing a procedure of processing a program request of a subscriber. On receipt of a request for program X, a CPU checks whether the subscriber P is entitled to view the program X, referring to a column "IDs of allowable programs" for the subscriber P in the data base (Step 0). When the subscriber P is permitted to view the program P, the CPU refers IDs of programs and judges whether the program X relates to a VOD service (Step 1). The procedure is finished (Step 8) if the subscriber P is not permitted to see the program X.

If the program X is found not to relate to the VOD service at Step 1, the CPU refers to the current program IDs for all subscriber (1–M) in turn to determine whether the program is now viewed by any one of the subscribers (1–M) (Steps 2 and 3). If the ID of the program X corresponds to a current program ID, the CPU connects a working converter, which is used by a subscriber and has an ID determined in a column "IDs of working converters", to a RF-modulator designated for the subscriber P (Step 4).

In case that the program X relates to the VOD service (at Step 1) or does not correspond to any one of current program of all subscribers (Step 2), the CPU searches a vacant converter (Step 5) since no subscriber views the program X. If there is no vacant converter, the procedure is finished (Step 8). It is also possible to search again a vacant converter after a waiting period of several seconds to several minutes.

If a vacant converter L is found at Step 5, it is connected to a RF-modulator designated for the subscriber P (Step 6). Then, the CPU updates items of the subscriber P in the data base according to the connecting methods of Steps 4 and 6 (Step 7) and finish the procedure (Step 8).

The data base of FIG. 6 shows that subscribers with ID No. 1 and No. 4 are connected to the same converter and the subscriber with ID No. 2 views two programs by using two converters.

A pay-per-view service (hereinafter abbreviated to PPV) that supplies a specified broadcast program according to a specified schedule at a specified fee charged for a viewer may be received by a plurality of subscribers at a shared charge. In this case, processing may be done according to a flow chart shown in FIG. 8. Steps similar to those shown in FIG. 7 are given the same numbers.

A program X that was requested by a subscriber and found not to relate to the VOD service (Step 1) is then checked whether it relates to the PPV service or not (Step 9). The procedure advances to Step 2 if the program doses not relate to PPV service. If the program relates to PPV service, the number of viewers of the program X is incremented by 1 (an initial value=0) (Step 10). The service charge is divided a total number of the counted viewers to determine a charge for each viewer. Namely, the viewers can view the program supplied by the PPV service at a low rate. This may promote access to the PPV service.

The method described above with reference to FIG. 7 manages the converters by checking for "busy or vacant". The conveniences to use the regional common-use block can be considerably improved by adding functions for determining a residual working time of a busy converter, informing a requesting subscriber of a waiting time until the converter becomes available to use and registering a reserved order of a subscriber for using the converter. FIGS. 9A and 9B are flow charts showing a procedure for this case. Steps similar to those shown in FIG. 7 are given the same numbers.

The same procedure as the case of FIG. 7 is conducted to Step 11. If there is a reservation for the converter, the procedure advances to Step 12. When there is no reservation, a vacant converter is searched: information that a found vacant converter will be connected is sent to a subscriber P (Step 17) and the converter is connected to the subscriber P (Step 6). If no vacant-converter is found, the procedure advances to Step 12.

A converter that may become free in the shortest waiting time is searched among all converters except for the reserved converter (Step 12) and information on the waiting time is given to the subscriber (Step 13). An inquiry is made whether the subscriber will make a reservation for the converter searched at Step 12 (Step 14): a reservation is registered if the subscriber ordered (Step 15). The procedure ends if the subscriber did not make a reservation (Step 8).

After registering the reservation for the converter (Step 14), the system waits until a "releasing-wait" signal is inputted (Step 16).

When an ending signal of a program viewed by a subscriber Q (who is supposed as connected to a converter G) comes, the converter G is disconnected from a transmission line of the subscriber Q (Step 18) and, at the same time, a "releasing-wait" signal is sent to Step 16. The data base of the subscriber Q is then updated (Step 19) and the process for the subscriber Q ends (Step 20).

At Step 16, if the reservation of the subscriber P has its turn at the time of reception of the "releasing-wait" signal, the converter G is found (Step 11), information "the converter will be connected" is given to the subscriber P (Step 17) and the converter is connected to a line of the subscriber P (Step 6).

In this example, a converter that has no reservation is used if it became free before a converter having a reservation becomes free. If such event occurred, it is necessary to update the registration of reservation for the related converter.

Figure 10A:
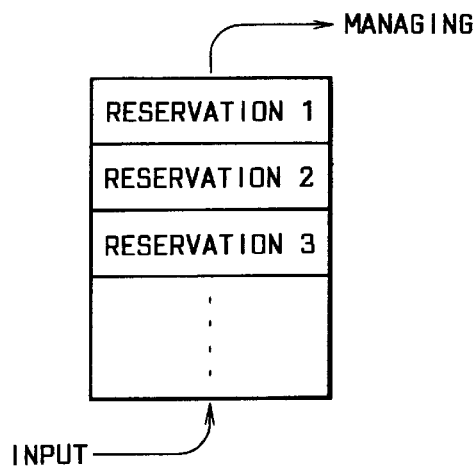
FIG. 10A is a view for explaining a method for distributing converts to reservations based on the ordered time.
Figure 10B:
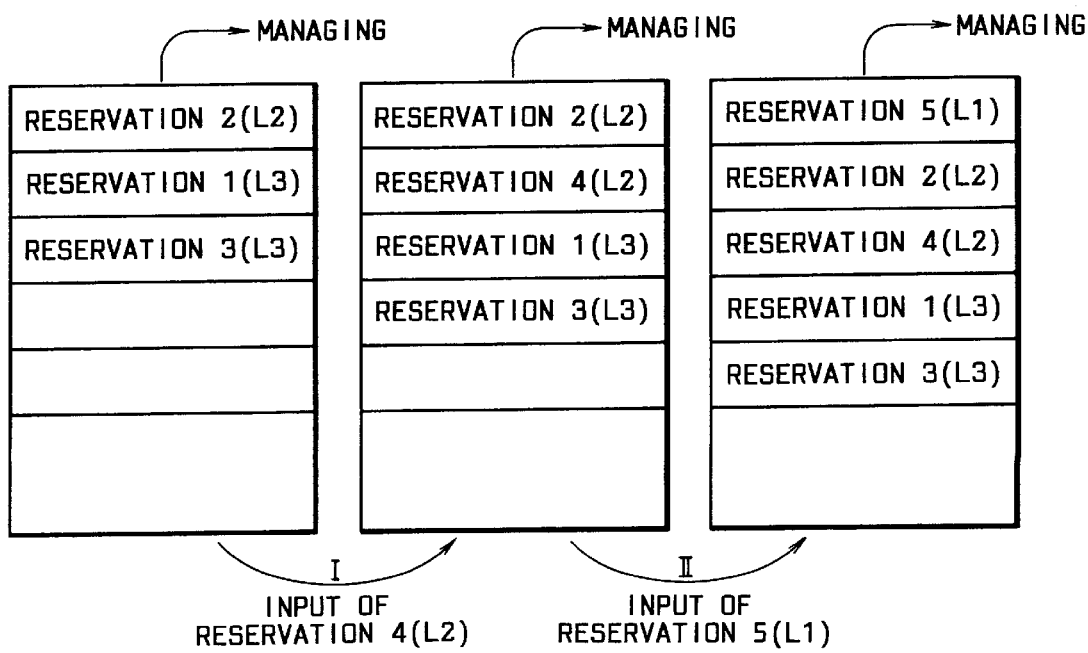
FIG. 10B is illustrative of a method for treating distributing converters to reservations by priority of the changes for using the converters.

FIGS. 10A and 10B are illustrative of examples of registered reservations 1, 2, . . . . A method of processing the reservation is as follows:

FIG. 10A relates to a method for distributing converters to reservations in order of ordering time.

FIG. 10B relates to a method for distributing converters to reservations by priority of levels L1, L2 and L3 predetermined according to charges for using converters.

Referring to tables below in FIG. 10B, a reservation 4 (level 2) is now inputted (as indicated by an arrow I). This order is higher in level than reservations 1 (level 3) and 3 (level 3) and equal to a reservation 2 all of which has been registered as shown in the leftmost table. The reservation 4 is, therefore registered after the reservation 2 as shown in the middle table. When a reservation 5 (level 1) is further inputted (as indicated by an allow II), it is arranged at the top of the queue since its level is higher than all other reservations 1–4.

The above-mentioned management of converters by the priority of levels (i.e., right of using converters) predetermined according to steps of charges can offer flexible service to such subscribers that want to use a converter at a shortest waiting time by paying an increased charge.

Referring to FIG. 3, a method for transmitting a program to a subscriber is described below:

Three RF-modulators (A, B, C) 112 are provided for each subscriber, which modulators 112 modulate output of a converter 107 connected thereto by a switching circuit 110. The RF modulated signals 120 from the RF-modulators is mixed with a free-charge broadcast 106 and a telephone signal 119 by a mixer 113.

Figure 11:
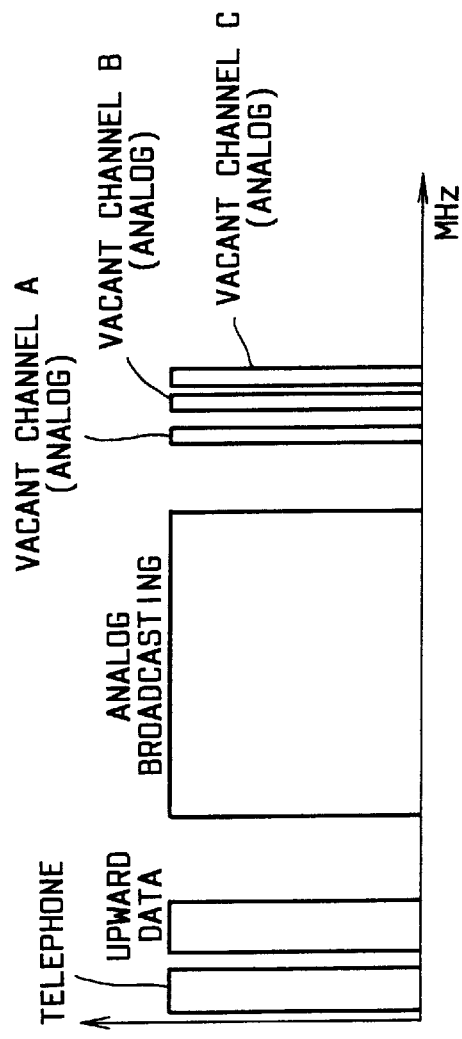
FIG. 11 shows an example of distributing frequencies to subscribers' lines in a regional common-use block according to the present invention.

FIG. 11 is illustrative of an exemplified frequency assignment. Signals modulated by the RF-modulators A, B and C are inserted into vacant channels A, B and C, respectively, of a free-charge analog broadcast. This method enables each subscriber to view three different subscription broadcast programs on three TV sets each provided with a simple receiver only and to view free-charge broadcasts on any number of TV sets. The subscriber can view free-charge broadcasts on TV sets even in the worst case where access to the regional common-use block is impossible because the number of accesses thereto exceeds a limit value.

As shown in FIG. 3, transmission lines are laid out in star network from the regional common-use block to respective subscribers. The system of the regional common-use block can be, therefore, simplified by applying frequency assignment shown in FIG. 11. In the case of a tree network that allows a plurality of subscribers to commonly use a transmission line from the regional common-use block, it is required to make vacant channel frequency bands different for each subscriber.

The number of the RF-modulators per subscriber, although it is three in the shown embodiment, may be increased or decreased according to the contract made with an individual subscriber. It is also possible that the regional common-use block has the same number of RF-modulator as that of the converters and mixes RF-modulated signals by switching circuits. As shown in FIG. 3, the free-charge broadcast taken out from the signals transmitted from CATV center is mixed into the transmission lines to the subscribers. However, the free-charge broadcast may be transmitted through the converter to the subscriber line.

Figure 12:
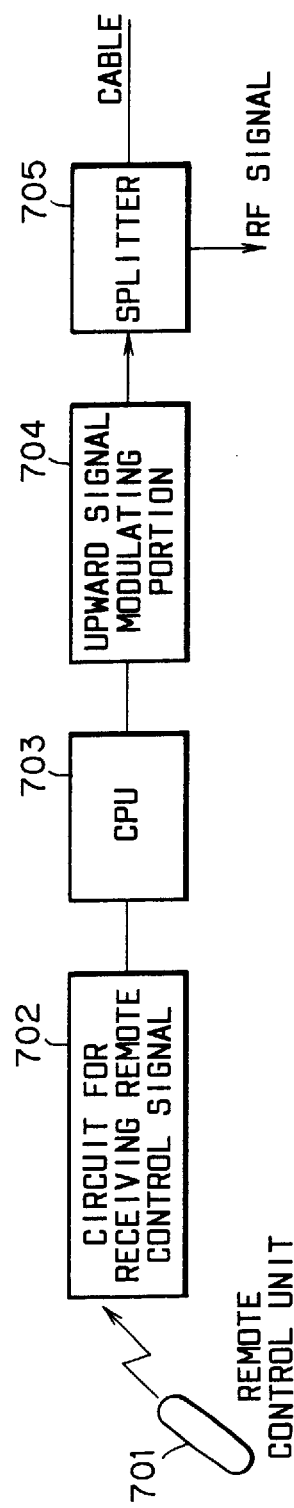
FIG. 12 illustrates a receiver to be attached to a subscriber's instrument belonging to a regional common-use block according to the present invention.

FIG. 12 is a block diagram showing an example of a receiver. When a subscriber selects a menu on a remote control 701, the receiver selects a specified channel that is previously assigned (1:1 in relation to a RF-modulator of the regional common-use block). An IR (infrared beam) signal from the remote control 701 is received by a remote-control receiving circuit 702, decoded by a CPU 703, modulated, e.g., according to QPSK modulation method by an upward signal modulating portion 704 and then interposed into an upward channel by a splitter 705.

Thus, the receiver to be attached to a subscriber terminal as compared with any conventional subscriber terminal is very simple, easy to use and available at a low price and requires a small space to install.

Figure 13:
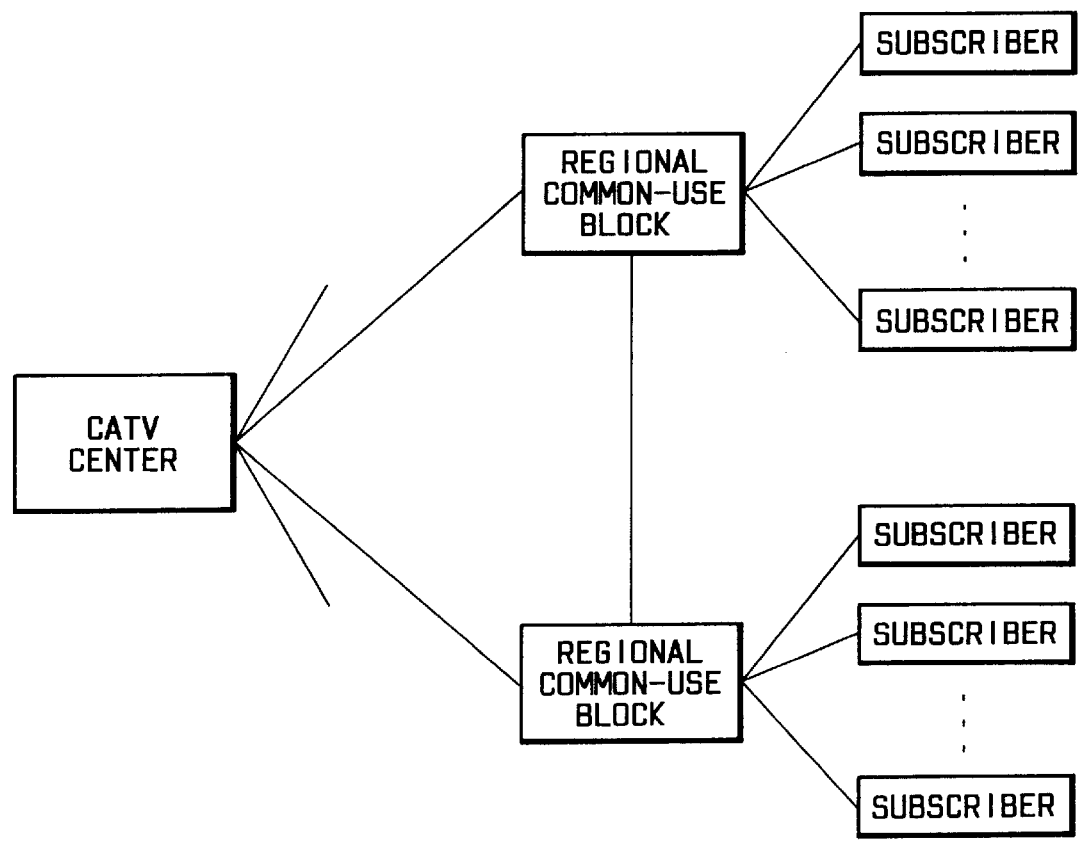
FIG. 13 shows an example of parallel connections of regional common-use blocks in a CATV system according to the present invention.

As shown in FIG. 13, regional common-use blocks can be connected in parallel so that an access from a subscriber belonging to one regional block may be accepted by the another regional block in case when the former block is overloaded and the latter has an allowance in capacity. This increases the working stability of the regional common-use block system.

Figures 14, 14A:
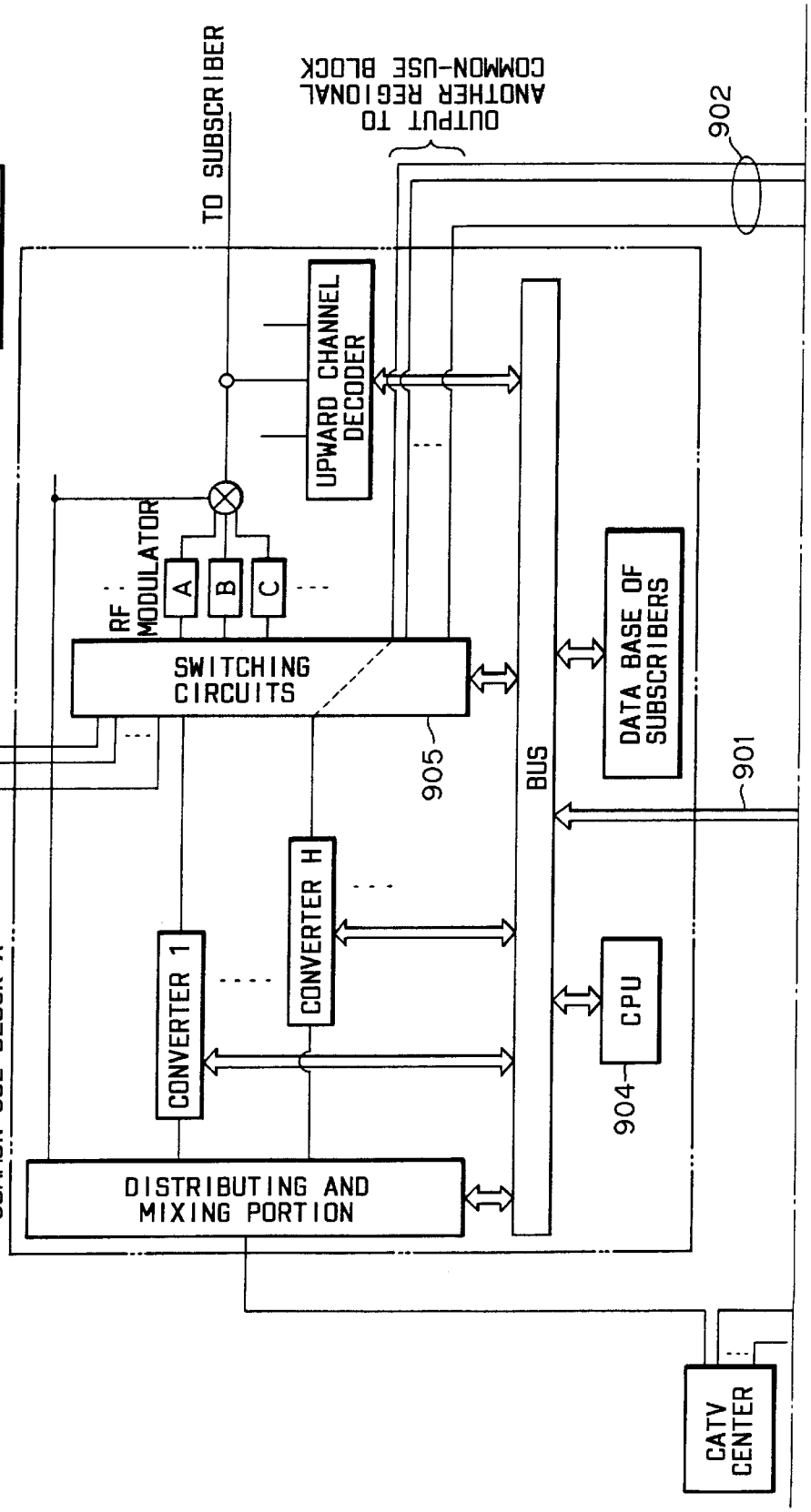
FIGS. 14A and 14B show an example of parallel connected regional common-use blocks according to the present invention.
Figure 14B:
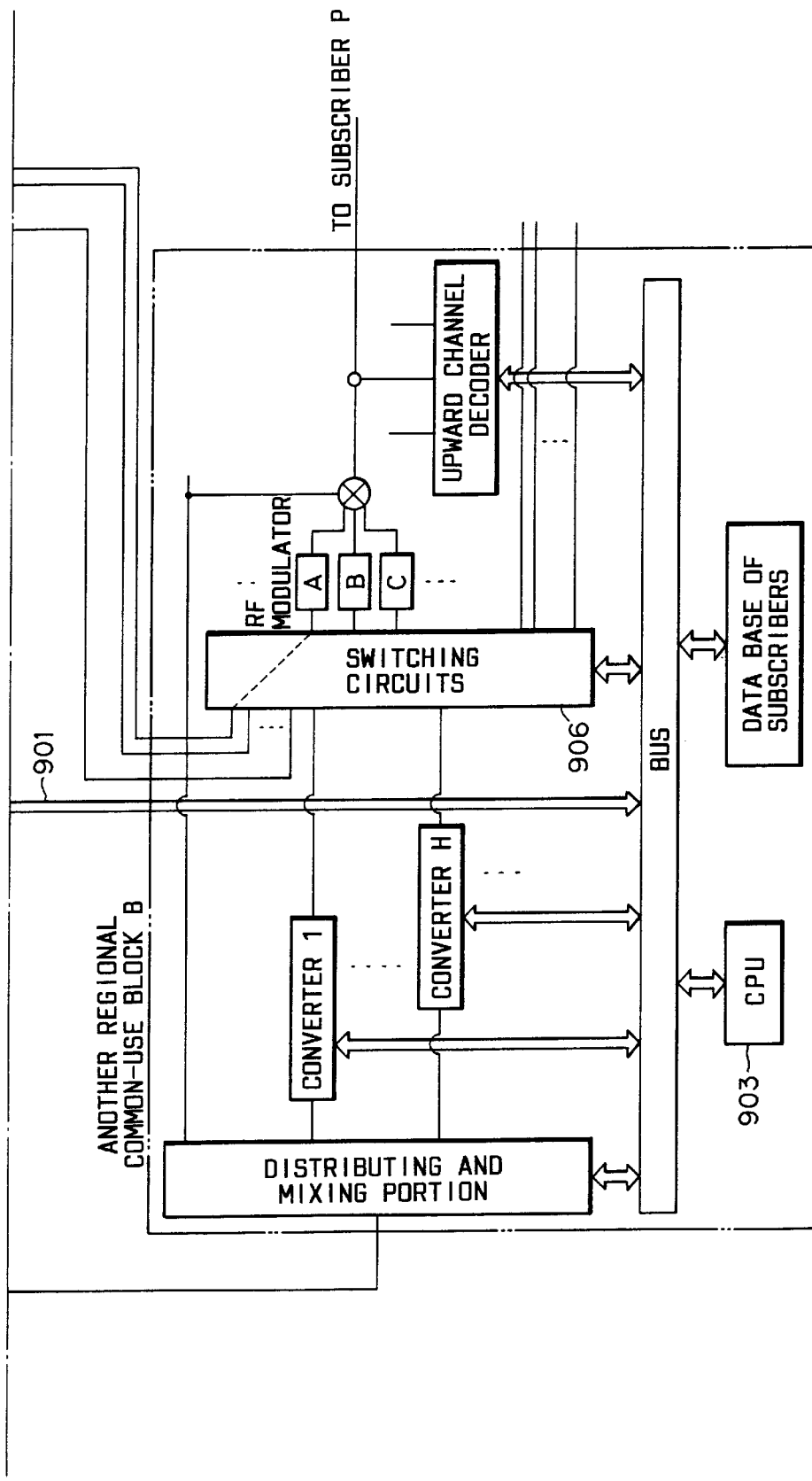

FIGS. 14A and 14B show the construction of regional common-use blocks connected in parallel.

Regional common-use blocks A and B are connected with each other with a cable 901 for connecting CPUs and a plurality of input/output cables 902 for connecting switching circuits between regional common-use blocks. When CPU 903 of the regional common-use block B recognizes there is no vacant converter to accept a request from a subscriber P belonging to the regional common-use block B, a CPU 904 of the regional common-use block A through the cable 901 is provided with information necessary for supplying a program requested by the subscriber P. The CPU 904 searches a suitable converter H by performing steps of FIG. 7 and switches the switching circuit 905 to output the program to the regional common-use block B. The CPU 903 of the regional common-use block B also switches the switching circuit 906 to receive the program from the regional common-use block A. Thus, the program required by the subscriber P can be transmitted by using a converter of the other regional common-use block.

Figure 15:
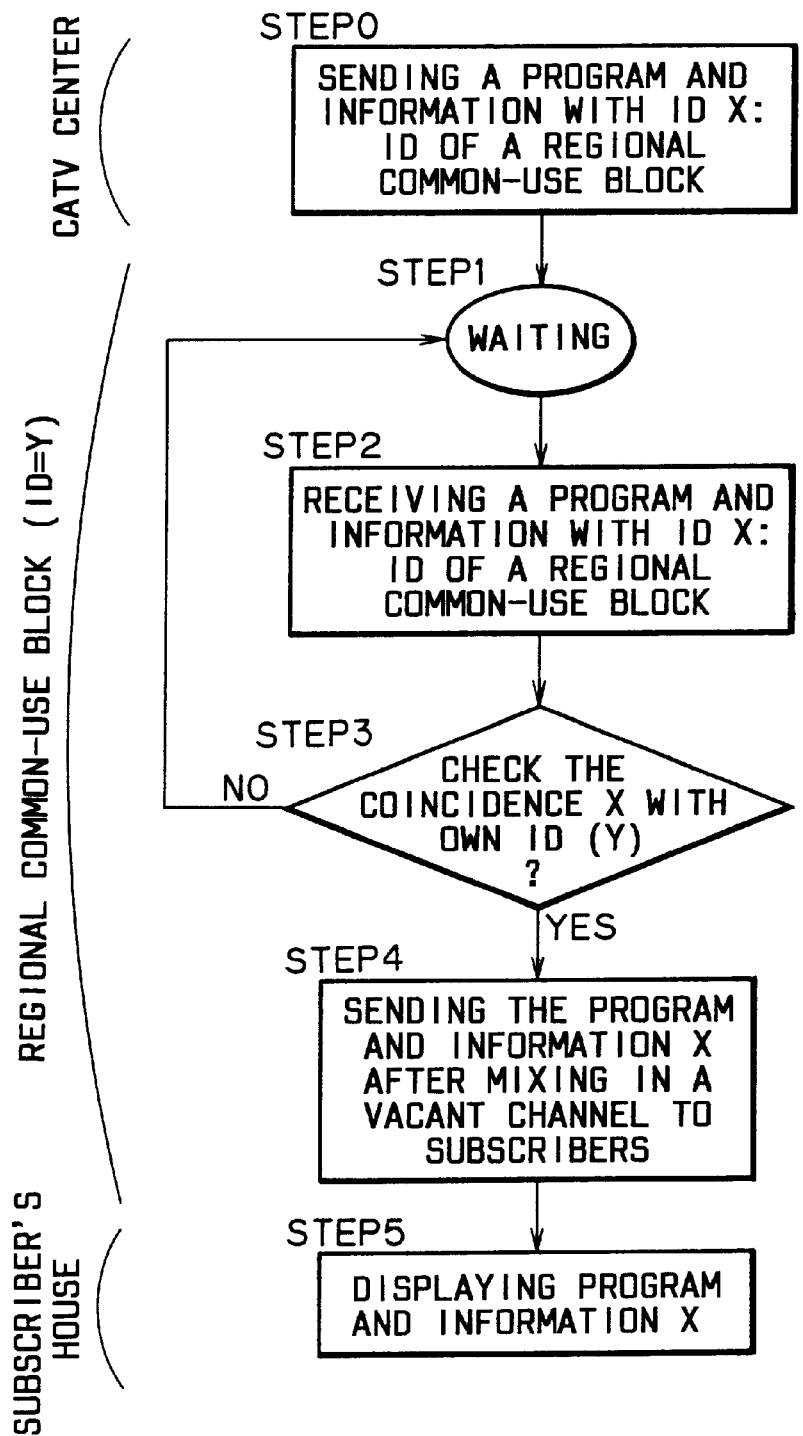
FIG. 15 is illustrative of an example of delivery from/to a regional common-use block system according to the present invention.

Delivery of information from/to a regional common-use block can be easily conducted with an identifier (ID) given to the regional common-use block without using any special terminal at each subscriber site. This also facilitates the processing in the CATV center. FIG. 15 is a flow chart of processing with ID.

When the CATV sends information with an ID (X in this case) of a regional common-use block to a plurality of regional common-use blocks (Step 0), each regional common-use block receives the information with ID X (Step 2) and checks whether the ID (X) coincides with own ID (Y in the shown case) (Step 3). If so, the regional common-use block mixes the information having ID (X) in a specified vacant channel and transmits the information to own subscribers (Step 4). Each subscriber can view the information using the vacant channel (Step 5). If the ID (X) does not agree with own ID, the regional common-use block returns to Step 1 and waits until information with ID is transmitted from the CATV center.

Figure 16:
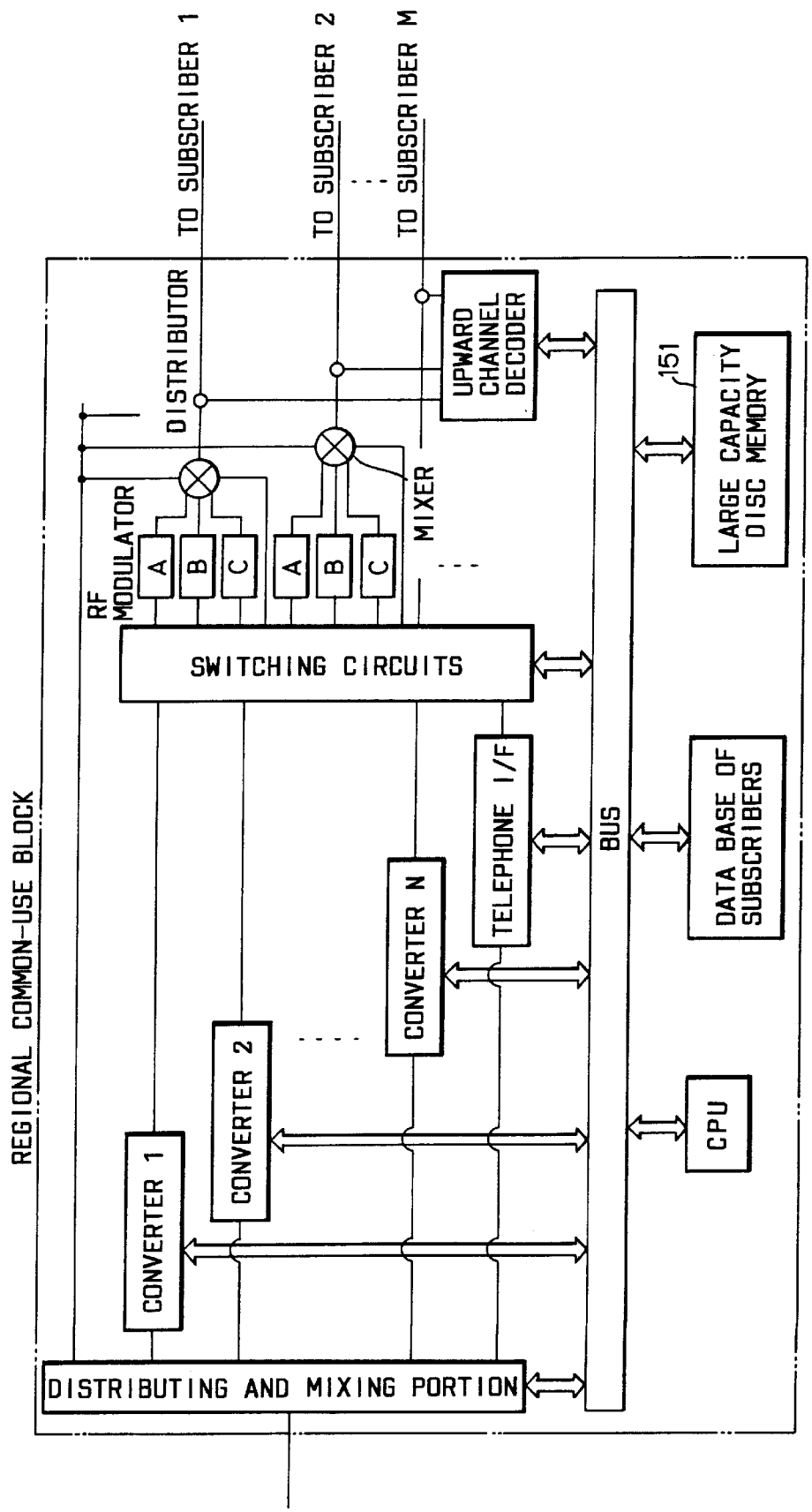
FIG. 16 shows an example of conducting a local VOD in a regional common-use block according to the present invention.

As shown in FIG. 16, a regional common-use block may use a large-capacity disk memory 151 to perform a local VOD service. In this case, the system may have a self-learning function and store programs by priority of higher audience rates, thereby enabling subscribers to view favorite programs (news, sports and so on) at any time by effectively using a limited disk storage.

Figure 17:
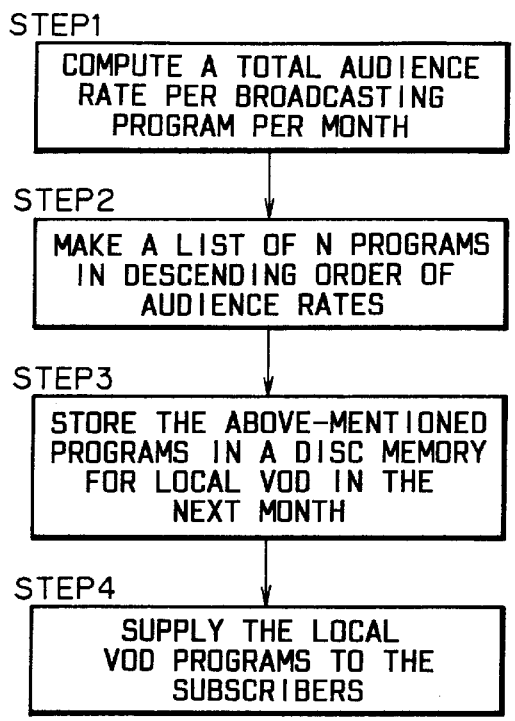
FIG. 17 shows an example of processing a local VOD according to an audience rate in a regional common-use block according to the present invention.

FIG. 17 shows an example of processing in the above-mentioned embodiment. At the end of the month, a usual audience rate of each program in the month is calculated (Step 1), a list of N programs of high audience rates is prepared (Step 2), N listed-up programs to be broadcast in the next month will be recorded in a large-capacity disk storage for local VOD service (Step 3) and N stored programs will be supplied as VOD service programs to the subscribers (Step 4).

A viewing time can be shortened by applying a rapid feeding function allowing a subscriber to hear audio signal. The content of the local VOD service can be improved by previously registering subscribers' favorite programs or kinds of hobby and interests and automatically selecting and storing the suitable broadcasts.

Figure 18:
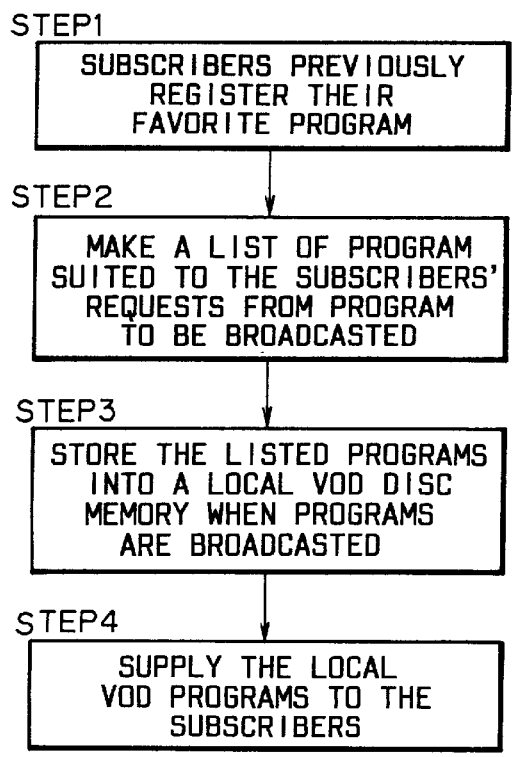
FIG. 18 shows an example of processing a local VOD according to a preliminary registration of a subscriber in a regional common-use block according to the present invention.

FIG. 18 shows an example of processing in the above-mentioned embodiment. The subscribers previously register their favorite programs (Step 1). Programs suited to the subscribers' requests are selected among programs to be broadcast and a list of the programs is made (Step 2), the selected programs are recorded in the storage for the local VOD service when the programs are broadcasted (Step 3) and the stored programs will be supplied as the local VOD programs to the subscribers (Step 4).

As is apparent from the foregoing, the embodiments of the present invention can offer the following advantages (1) to (23):

(1) The embodiment system according to the present invention enables each subscriber to view a plurality of different broadcasts on a plurality of TV sets that are connected to a CATV network and provided each with a simple small-sized receiver available at a low price. The important installations are mounted in the CATV center and regional common-use blocks and can be easily maintained. The each regional common-use block includes a plurality of the same function converters that may work in place of another if the latter is damaged. This assures the reliable operation of the system.

(2) In addition to the above-mentioned effect (1), the embodiment system enables each subscriber to receive telephone services without recognizing a network.

(3) In addition to the above-mentioned effects (1) and (2), the embodiment system can supply a program having a high audience rate without lacking in the number of converters. Each converter is efficiently used in common by a plurality of subscribers. Converters that are used by another subscriber to access different programs or services are also reserved. All these features realize saving in the number of converters of the system and in equipment investment as compared with any conventional system.

(4) In addition to the above-mentioned effects (1) to (3), the embodiment system can adaptively switch circuits with reference to the subscriber data base.

(5) In addition to the above-mentioned effect (4), the embodiment system eliminates the need for scrambling a toll broadcast itself. Processing in the CATV center is also simplified. There is no need for attaching descrambling function to a CATV terminal in the subscriber's house. Thus, the cost can be saved.

(6) In addition to the above-mentioned effects (1) to (5), the embodiment system enables each subscriber to view free-charge digital and analog broadcasts a TV set even in the worst case where it is impossible to access the regional common-use block because the number of accesses thereto exceeds a limit value. A TV set without a receiver adapted to a CATV system can display digital and analog free-charge broadcasts.

(7) In addition to the above-mentioned effect (6), the embodiment system can take-out an analog free-charge broadcast band and insert a program from a converter into a specified vacant channel. This additional function enables each subscriber to view a free-charge analog broadcast on a TV set even in the worst case where it is impossible to access the regional common-use block because the number of accesses thereto exceeds the limit value. A TV set without a receiver adapted to a CATV system can display an analog free-charge broadcast.

(8) In addition to the above-mentioned effects (1) to (7), the embodiment system can realize saving in cost of each converter and can adjust the number of converters depending to the number of subscribers and the number of requests from subscribers. Thus, the system can be easily changed to eliminate an excessive equipment and has an excellent flexibility.

(9) In addition to the above-mentioned effects (1) to (8), the embodiment system can be easily expanded in its capacity according to the working load and conditions.

(10) In addition to the above-mentioned effects (1) to (9), the provision of storage means in a regional common-use block can realize a local VOD service that can easily deliver useful local information to the subscribers.

(11) In addition to the above-mentioned effect (10), the embodiment system enables each subscriber to view at any time a regular news program by using the VOD service, eliminating the necessity to record it on a tape by a video-tape recorder with a timer.

(12) In addition to the above-mentioned effect (10) or (11), the embodiment system can save a viewing time by applying a fast feeding function.

(13) In addition to the above-mentioned effect (12), the embodiment system enables each subscriber to recognize an audio signal even while the rapid feed is executed. This facilitates understanding the content of frames being fast fed.

(14) In addition to the above-mentioned effects (10) to (13), the local VOD service of a regional common-use block can meet requests from a plurality of subscribers.

(15) In addition to the above-mentioned effects (10) to (14), the local VOD service to supply programs reflecting the local interests and trends can be managed by effectively using the limited number of converters.

(16) In addition to the above-mentioned effects (10) to (14), the embodiment system can automatically select and store programs that correspond to favorite and interesting programs previously registered by the subscribers. Thus, the service can be enriched according to the subscribers' demands.

(17) In addition to the above-mentioned effects (1) to (16), the embodiment system can inform a requesting subscriber of waiting time. The subscriber can decide the following action according to the informed waiting time.

(18) In addition to the above-mentioned effect (17), the embodiment system enables a requesting subscriber to place a reservation on using a converter, thus eliminating the need for repeating an access to the system.

(19) In addition to the above-mentioned effects (1) to (18), the embodiment system can flexibly respond to a subscriber who wants to receive the service at once.

(20) In addition to the above-mentioned effects (1) to (19), the embodiment system enables subscribers to receive a PPV service at a low charge.

(21) In addition to the above-mentioned effects (1) to (20), the embodiment system can be simply constructed in such a manner that each subscriber's line is connected in relation of 1:1 to a regional common-use block and TV signals to be sent to all subscribers are converted to signals of a specified channel band.

(22) In addition to the above-mentioned effects (1) to (20), a plurality of regional common-use blocks is connected in parallel to each other in such a way that another regional common-use block can be used when the number of accesses to one regional common-use block exceeds a specified limit value. This makes it possible to provide a subscriber with a service from another regional common-use block. Thus, the system has an increased stability and, at the same time, a reduced margin of accesses per regional common-use block, assuring saving in the equipment cost.

(23) In addition to the above-mentioned effects (1) to (20), the CATV system can have a plurality of regional common-use blocks, each of which can manage the local program supply service. Namely, it can provide a system for supplying broadcast programs transmitted from the CATV center to a very small area, i.e., a specified local block (e.g., 1 unit=about 10–30 houses having about 30 TV sets in total). In the other words, homes having TV sets and belonging to the local area can receive local broadcasts (e.g., grade school sports, local community reports and so on) through the regional common-use block without using any special instrument (e.g., desk rumbler). This local system may be developed as new marketing means for supplying, e.g., local commercial messages. Thus, the delivery of information from/to each regional common-use block can be easily performed: each subscriber has no need for using any special terminal equipment and the CATV center can easily process for delivery of information.

What is claimed is:

1. A regional common-use block of a CATV system, comprising:
    separating means for separating video, audio and data in a multiplexed signal inputted from a CATV center;
    a plurality of converters for removing video, audio and data from the inputted multiplexed signal by converting signals separated by the separating means;
    an upward signal decoding portion for removing inputted subscriber request signals from a signal transmitted through a distributor;
    switching means for switching connections between the converters and subscribers' lines according to successive subscriber's request signals received from the upward signal decoding portion, with a predetermined frequency of one of a plurality of vacant channels, wherein said switching means enable a plurality of subscribers to be connected to the output of a single converter; and
    modulators for modulating TV signals to be transmitted to subscribers' lines which have been switched and connected by the switching means.

2. A regional common-use block of a CATV system according to claim 1, further including a telephone I/F portion for dealing with a telephone signal so that a signal from the telephone I/F portion is mixed with a TV signal modulated by the RF modulator, wherein the TV and telephone signals are transmitted via a cable to a subscriber to enable each subscriber to exchange information by using a simple receiver of a TV or telephone set.

3. A regional common-use block of a CATV according to claim 1, wherein in cases where a broadcast program requested by a subscriber has been already converted by the converter and connected to another subscriber, the switching means connects the output of the same converter to the requesting subscriber, thereby improving a working efficiency of the converter.

4. A regional common-use block of a CATV system according to claim 1, further including a subscriber data base, wherein the subscriber data base and switching means are controlled according to a method determined with reference to the subscriber data base.

5. A regional common-use block of a CATV system according to claim 4, wherein the subscriber data base contains information on what program each subscriber is entitled to view, and wherein a requested program is supplied to a line of a requesting subscriber who is found entitled to view the requested program according to information stored in the subscriber data base, and wherein the program will not be supplied to a subscriber who is not entitled to view the program.

6. A regional common-use block of a CATV system according to claim 1, wherein a TV signal and a telephone signal removed from the inputted multiplexed signal by the converting means and modulated by the RF modulator are mixed with free-charge broadcast analog and digital signals separated from the inputted multiplexed signal, and subsequently transmitted to a line of the subscriber.

7. A regional common-use block of a CATV system according to claim 6, wherein the TV signal is mixed in a specified channel band of the analog free-charge broadcast signal.

8. A regional common-use block of a CATV system according to claim 1, wherein the plurality of converters further include at least a digital satellite broadcasting converter, digital CATV converter, analog CATV converter, cable modem converter and ISDN converter to improve economical efficiency and flexibility of the system.

9. A regional common-use block of a CATV system according to claim 1, wherein the converters are card type or box plug-in-type, thereby facilitating a change in the number or kinds of converters.

10. A regional common-use block of a CATV system according to claim 1, further including storing means for supplying video signals to a subscriber when a local VOD service is performed.

11. A regional common-use block of a CATV system according to claim 10, wherein the storing means stores bit streams from TV signals removed by the converters to absorb time lags between subscribers' requests for the same service.

12. A regional common-use block of a CATV system according to claim 10, further including a viewing time-saving function which employs a rapid-feed.

13. A regional common-use block of a CATV system according to claim 10, wherein bit streams from the same TV signals are stored in a plurality of places in the storing means to satisfy the requests of subscribers.

14. A regional common-use block of a CATV system according to claim 10, wherein TV signals of programs having high audience rates in a specified period are stored in the order of priority in the storing means, thereby preserving capacity of the storing means while simultaneously satisfying subscribers' demands.

15. A regional common-use block of a CATV system according to claim 10, wherein programs are stored in the storing means according to advanced orders of the subscribers.

16. A regional common-use block of a CATV system according to claim 1, further including a management function for distributing the converters to subscribers' lines by using switching means, wherein the management function further includes an informing function for informing a subscriber of a waiting time until the converter becomes vacant, wherein the informing function considers a residual working time of the converter, in addition to information on whether the converter is either busy or vacant.

17. A regional common-use block of a CATV system according to claim 16, further including a booking function which books an advanced order of a subscriber for using the working converter, and which informs the subscriber of the possibility of using the converting means as soon as the converter becomes vacant.

18. A regional common-use block of a CATV system according to claim 16, wherein the management function further includes a priority level function for setting several levels of priority of subscribers for the right of using the converters, and for controlling distribution of the converters according to the priority levels.

19. A regional common-use block of a CATV system according to claim 16, wherein the management function further includes a pay per view function for enabling subscribers to hold a pay per view right in common to thereby receive services at a low charge.

20. A regional common-use block of a CATV system, according to claim 1 wherein each subscriber's house is connected in one-to-one star-connection to a regional common-use block by using a transmission channel distributed to each subscriber, and wherein a frequency band is used in common to the RF modulators in the regional common-use block and TV signals to be sent to all subscribers are converted to signals of a specified channel band, thereby simplifying the structure of the system.

21. A regional common-use block of a CATV system according to claim 1, wherein the system further comprises a plurality of regional common-use blocks connected in parallel to each other so that another regional common-use block can be used when the number of accesses to one regional common-use block exceeds a specified limit value.

22. A regional common-use block of a CATV system according to claim 1, wherein the regional common-use block is one of a plurality of regional common-use blocks, and wherein an ID is added to each regional common-use block to facilitate delivery of information per each block.

23. A regional common-use block for use in a CATV system, comprising:

a plurality of converters for converting video, audio and data signals separated from an inputted multiplexed signal;

an upward signal decoding portion for separating subscriber request signals from a signal stream input into the common-use block by a plurality of subscribers;

a plurality of switching circuits for switching connections between the converters and the subscribers' lines based on the separated subscriber request signals, wherein said switching circuits enable a plurality of subscribers to be connected to the output of a single converter; and a plurality of modulators for modulating TV signals transmitted to subscribers' lines with a predetermined modulation frequency of at least one of a plurality of vacant channels.

24. A regional common-use block for use in a CATV system according to claim 23, further including a subscriber data base for storing information of programs that each of said plurality of subscribers is entitled to view, wherein the subscriber data base controls operation of the switching circuits so that a subscriber will receive a requested program only if the subscriber is entitled to view it.

25. A method for using a regional common-use block in a CATV system, comprising:

separating video, audio and data signals from multiplexed signals inputted by a CATV center;

converting the separated video, audio and data signals into TV signals with a plurality of converters;

separating subscriber request signals from a signal stream input into the common-use block by a plurality of subscribers, wherein the separating is perform by an upward signal decoder;

switching connections between the converters and subscribers' lines based on the separated subscriber request signals, wherein said switching enables a plurality of subscribers to be connected to the output of a single converter; and modulating TV signals transmitted to subscribers' lines with a predetermined modulation frequency of at least one of a plurality of vacant channels, the modulating being performed by a plurality of modulators.

26. The method according to claim 25, further including storing information of programs that each of said plurality of subscribers is entitled to view, wherein the storing is performed by a subscriber data base which controls operation of a plurality of switching circuits so that a subscriber will receive a requested program only if the subscriber is entitled to view it.

27. A method for using a regional common-use block in a CATV system, comprising:

converting video, audio and data signals separated from an inputted multiplexed signal with a plurality of converters;

separating subscriber request signals from a signal stream input into the common-use block by a plurality of subscribers, wherein the separating is perform by an upward signal decoder;

switching connections between the converters and subscribers' lines based on the separated subscriber request signals, wherein said switching enables a plurality of subscribers to be connected to the output of a single converter; and modulating TV signals transmitted to subscribers' lines with a predetermined modulation frequency of at least one of a plurality of vacant channels, the modulating being performed by a plurality of modulators.

28. The method according to claim 27, further including storing information of programs that each of said plurality of subscribers is entitled to view, wherein the storing is performed by a subscriber data base which controls operation of a plurality of switching circuits so that a subscriber will receive a requested program only if the subscriber is entitled to view it.

* * * * *